United States Patent
Yang

(10) Patent No.: US 11,610,079 B2
(45) Date of Patent: Mar. 21, 2023

(54) TEST SUITE FOR DIFFERENT KINDS OF BIASES IN DATA

(71) Applicant: salesforce.com, inc., San Francisco, CA (US)

(72) Inventor: Michael Yang, Valley Stream, NY (US)

(73) Assignee: salesforce.com, inc., San Francisco, CA (US)

( * ) Notice: Subject to any disclaimer, the term of this patent is extended or adjusted under 35 U.S.C. 154(b) by 422 days.

(21) Appl. No.: 16/777,912

(22) Filed: Jan. 31, 2020

(65) Prior Publication Data

US 2021/0241033 A1 Aug. 5, 2021

(51) Int. Cl.
*G06K 9/62* (2022.01)
*G06N 20/00* (2019.01)

(52) U.S. Cl.
CPC ......... *G06K 9/6257* (2013.01); *G06K 9/6262* (2013.01); *G06N 20/00* (2019.01)

(58) Field of Classification Search
CPC ............... G06K 9/6257; G06K 9/6262; G06K 9/6218; G06N 20/00
See application file for complete search history.

(56) References Cited

U.S. PATENT DOCUMENTS

| | | | |
|---|---|---|---|
| 2016/0042290 A1* | 2/2016 | Zhuang | G06F 40/169 706/12 |
| 2020/0372406 A1* | 11/2020 | Wick | G06N 7/005 |
| 2021/0133509 A1* | 5/2021 | Wall | G06N 3/0454 |
| 2022/0036203 A1* | 2/2022 | Nachum | G06N 20/00 |

FOREIGN PATENT DOCUMENTS

| | | | | |
|---|---|---|---|---|
| CA | 3017655 A1 | * | 3/2019 | ......... G06F 16/2455 |
| CN | 109522905 A | * | 3/2019 | ........... G06F 30/398 |
| JP | 2009259109 A | * | 11/2009 | |

* cited by examiner

*Primary Examiner* — Carol Wang

(57) ABSTRACT

There is provided computer implemented method for detecting and reducing or removing bias for generating a machine learning model, comprising: prior to generating the machine learning model: receiving a training dataset, comprising target inputs, each comprising parameters and labelled with a corresponding target output, wherein at least one of the parameters of at least of the target inputs comprises a sensitive parameter indicative of the corresponding target input assigned to a sensitive group that is potentially biased against other target inputs that are excluded from the sensitive group, analyzing the training dataset to identify target inputs affected by label bias when a statistically significant difference is detected between target inputs assigned to the sensitive group and target inputs excluded from the sensitive group, correcting labels of the target inputs affected by label bias, and generating the machine learning model using the corrected labels.

16 Claims, 4 Drawing Sheets

TEST SUITE FOR DIFFERENT KINDS OF BIASES IN DATA

BACKGROUND

Some embodiments relate to machine learning models and, more specifically, but not exclusively, to a test suite for different kinds of biases in data used to train a machine learning model.

Bias may arise in trained machine learning models. Such models may perform inaccurately (or less accurately) when fed certain types of input in comparison to when fed other types of input (for which the model may perform accurately or more accurately).

BRIEF DESCRIPTION OF THE SEVERAL VIEWS OF THE DRAWINGS

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

In the drawings.

DETAILED DESCRIPTION

Figure 1:
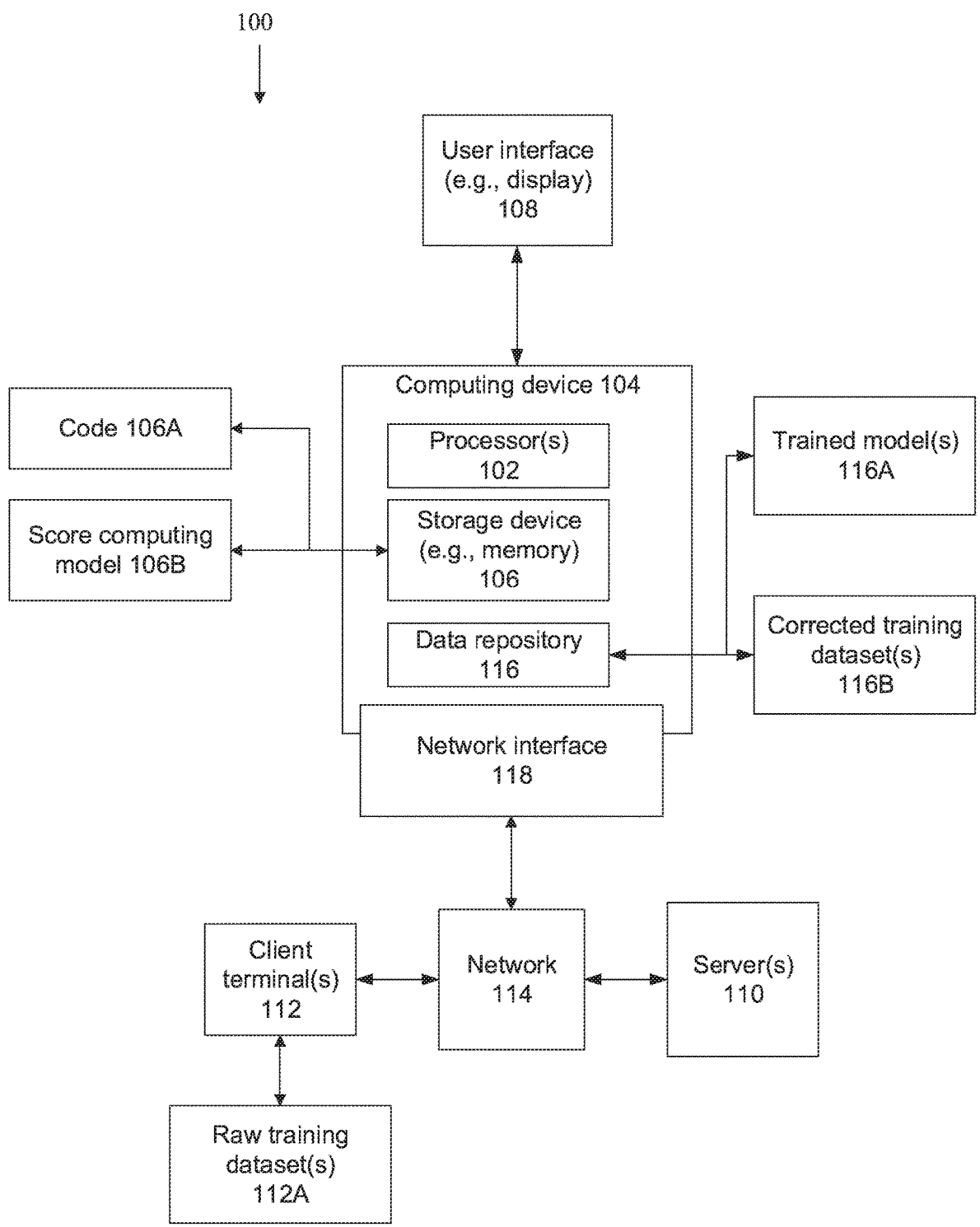
FIG. 1 is a block diagram of a system for detecting bias in a training dataset for training a machine learning model, in accordance with some embodiments.

According to a first aspect, a computer implemented method for detecting and reducing or removing bias for generating a machine learning model, comprises: (i) prior to generating the machine learning model: receiving a training dataset, comprising a plurality of target inputs, each comprising a plurality of parameters and labelled with a corresponding target output, wherein at least one of the plurality of parameters of at least of the plurality of target inputs comprises a sensitive parameter indicative of the corresponding target input assigned to a sensitive group that is potentially biased against other target inputs that are excluded from the sensitive group, analyzing the training dataset to identify target inputs affected by label bias when a statistically significant difference is detected between target inputs assigned to the sensitive group and target inputs excluded from the sensitive group, correcting labels of the target inputs affected by label bias, and (ii) generating the machine learning model using the corrected labels.

According to a second aspect, a computer implemented method for detecting and reducing or removing bias for generating a machine learning model, comprises: (i) prior to generating the machine learning model: receiving a training dataset, comprising a plurality of target inputs, each comprising a plurality of parameters and labelled with a corresponding target output, wherein at least one of the plurality of parameters of at least of the plurality of target inputs comprises a sensitive parameter indicative of the corresponding target input assigned to a sensitive group that is potentially biased against other target inputs that are excluded from the sensitive group, analyzing the training dataset to detect sampling bias between the target inputs of the sensitive group and other target inputs excluded from the sensitive group, and (ii) generating one respective machine learning model for the target inputs of the sensitive group and generating another respective machine learning model for the other target inputs excluded from the sensitive group.

According to a third aspect, a system for detecting and reducing or removing bias for generating a machine learning model, comprises: at least one hardware processor executing a code for: (i) prior to generating the machine learning model: receiving a training dataset, comprising a plurality of target inputs, each comprising a plurality of parameters and labelled with a corresponding target output, wherein at least one of the plurality of parameters of at least of the plurality of target inputs comprises a sensitive parameter indicative of the corresponding target input assigned to a sensitive group that is potentially biased against other target inputs that are excluded from the sensitive group, analyzing the training dataset to identify target inputs affected by label bias when a statistically significant difference is detected between target inputs assigned to the sensitive group and target inputs excluded from the sensitive group, correcting labels of the target inputs affected by label bias, and (ii) generating the machine learning model using the corrected labels.

In a further implementation form of the first and third aspects, further comprising: computing by a score computing machine learning model, for each respective target input, a probability of the respective target input being assigned to the sensitive group according to a respective value of the corresponding sensitive parameter.

In a further implementation form of the first and third aspects, further comprising: cluster the plurality of target inputs into a plurality of clusters according to corresponding computed probabilities, wherein for each respective cluster, target inputs assigned to the respective cluster are associated with probabilities within a certain probability value range, wherein each cluster includes target inputs assigned to the sensitive group and target inputs excluded from the sensitive group, for each respective cluster: determining whether the statistically significant difference exists between target inputs assigned to the sensitive group and other target inputs excluded from the sensitive group, and identifying label bias for the respective cluster when the statistically significant difference is detected, wherein the at least one target input affected by label bias comprises the target inputs of the respective cluster, including the target inputs assigned to the sensitive group and target inputs excluded from the sensitive group.

In a further implementation form of the first and third aspects, correcting labels of the target inputs affected by label bias comprises correcting labels for the target inputs assigned to the sensitive groups and labels of the other target inputs excluded from the sensitive group.

In a further implementation form of the first and third aspects, the correcting labels comprises assigning the same label to all of the target inputs assigned to the sensitive groups and to all of the other target inputs excluded from the sensitive group.

In a further implementation form of the first and third aspects, the probability of the respective target input being assigned to the sensitive group is computed by the score computing machine learning model performing a causal inference process, wherein a treatment of the causal inference procedure is the sensitive parameter.

In a further implementation form of the first and third aspects, the causal inference process comprises a propensity score matching (PSM) process, and the probability denotes the propensity score.

In a further implementation form of the first and third aspects, further comprising: computing accuracy of the score computing machine learning model for computing the probability of the respective target input being assigned to the sensitive group, and identifying sampling bias between target inputs of the sensitive group and other target inputs excluded from the sensitive group when the accuracy of the score computing machine learning model is above a threshold.

In a further implementation form of the first and third aspects, wherein (ii) generating further comprises generating one respective machine learning model for the target inputs of the sensitive group and generating another respective machine learning model for the other target inputs excluded from the sensitive group.

In a further implementation form of the first and third aspects, wherein each of the plurality of target inputs comprises the sensitive parameter, wherein the target inputs assigned to the sensitive group include a value of the sensitive parameter meeting a requirement, and other target inputs excluded from the sensitive group include another value of the sensitive parameter that does not meet the requirement.

In a further implementation form of the first and third aspects, wherein the sensitive parameter is selected from the group consisting of: gender, race, and age.

In a further implementation form of the second aspect, further comprising computing accuracy of a score computing machine learning model that computes a probability of a certain target input being assigned to the sensitive group, and detecting the sampling bias when the accuracy of the score computing machine learning model is above a threshold.

Unless otherwise defined, all technical and/or scientific terms used herein have the same meaning as commonly understood by one of ordinary skill in the art to which embodiments. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

Some embodiments relate to machine learning models and, more specifically, but not exclusively, to a test suite for different kinds of biases in data used to train a machine learning model.

As used herein, the term machine learning model may refer, for example, to one or more of: neural networks (of one or more architectures, for example, deep, convolutional, fully connected, encoder-decoder, and/or combinations of the aforementioned), Markov chains, support vector machine (SVM), logistic regression, k-nearest neighbor, and decision trees.

An aspect of some embodiments relates to systems, methods, an apparatus, and/or code instructions (i.e., stored on a memory and executable by one or more hardware processors) for detecting, and/or reducing and/or removing and/or preventing label bias in a generated a machine learning model trained based on a training dataset. Features are implemented prior to the generation of the machine learning model, to create the machine learning model with reduced and/or removed bias. The training dataset includes target inputs. Each target input includes multiple parameters and is labelled with a corresponding target output, representing a ground truth. One or more of the parameters of the target inputs represent a sensitive parameter, indicative of the corresponding target input being assigned to a sensitive group that represents a potential bias, and/or represents a protected group that should be treated fairly with respect to non-members of the protected group and/or which is potentially biased with respect to non-members of the sensitive group (i.e., target inputs that are excluded from the sensitive group). The training dataset is analyzed to identify target inputs affected by label bias. The label bias is identified when a statistically significant difference is detected between target inputs assigned to the sensitive group and target inputs excluded from the sensitive group. When the label bias is detected, the labels of the target inputs affected by label bias are corrected, for example, all affected labels are set to the same value. The machine learning model is generated using the corrected labels.

The label bias may represent a source of undesired bias (e.g., due to the sensitive parameter) that is to be removed. For example, people of different genders are to be treated equally by a machine learning model that selects candidates for a job.

It is note that as described herein, the case of a single sensitive parameter is used for simplicity of implementation and clarity of explanation. However, it is to be understood, that multiple sensitive parameters may be implemented, in which case the process for a single sensitive parameter is repeated for each different sensitive parameter and/or repeated for different combinations of sensitive parameters.

An aspect of some embodiments relates to systems, methods, an apparatus, and/or code instructions (i.e., stored on a memory and executable by one or more hardware processors) for detecting, and/or reducing and/or removing and/or preventing sampling bias in a generated a machine learning model trained based on a training dataset. Features are implemented prior to the generation of the machine learning model, to create the machine learning model with reduced and/or removed bias. The training dataset includes target inputs. Each target input includes multiple parameters and is labelled with a corresponding target output, representing a ground truth. One or more of the parameters of the target inputs represent a sensitive parameter. The training dataset is analyzed to detect sampling bias between the target inputs of the sensitive group and other target inputs excluded from the sensitive group. One respective machine learning model is generated for the target inputs of the sensitive group and another respective machine learning model is generated for the other target inputs excluded from the sensitive group, as opposed to generating a single machine learning model using the whole training dataset which would be biased.

The sampling bias may represent a source of desired bias (e.g., due to the sensitive parameter), where different groups are to be handled differently by different machine learning models. For example, children age and under 6, who attend kindergarten, are processed by one machine learning model, and children between ages 6 and 14 who attend primary school, are processed by another machine learning model. Since there is a significant difference between the two age groups, the same machine learning model should not handle both age categories.

Optionally, embodiments of the systems, methods, an apparatus, and/or code instructions described herein for label bias and sampling bias are combined, as described herein. In such combined implementation, a score computing machine learning model that computes a probability of a certain target input being assigned to the sensitive group, which is used to identify label bias, as described herein, is used to identify sampling bias. The accuracy of the score computing machine learning is compared to a threshold representing high accuracy. When the accuracy is above the threshold, sampling bias is identified.

At least some implementations of the systems, methods, apparatus, and/or code instructions described herein address the technical problem of identifying and/or removing sources of bias in machine learning models. Individuals that use automated machine learning tools generally do not understand the different ways bias can enter data. In fact, the use of the term "biased data" with respect to machine learning is generic and vague, and doesn't not help users determine how the bias is caused and/or how the bias may be removed and/or reduced. Understanding sources of bias, kinds of bias, and/or whether bias exists may help end users examine planned processes for using the planned machine learning model trained on the biases training dataset, and/or to help make a more informed decision about whether to build a predictive model based on biased data. In particular, as described herein, at least some implementations of the systems, methods, apparatus, and/or code instructions described herein identify the cause of the bias in the training dataset, and take action to remove and/or reduce the bias, for creating model(s) with reduced and/or removed bias.

At least some implementations of the systems, methods, apparatus, and/or code instructions described herein improve the technical field of identifying and/or removing sources of bias in machine learning models. The improvement may be for automated, or even non-automated, standard machine learning practices, which do not typically include any bias detection and/or removal as part of the typical data exploration and preparation. Moreover, the most popular practices regarding bias in machine learning models tend to occur after model creation—after having created the model, users may use a variety of fairness definitions and off-the-shelf libraries to check and potentially fix their model for bias. In contrast, at least some implementations of the systems, methods, apparatus, and/or code instructions described herein detect bias before the model is created, which enables correcting the training dataset for removal and/or reduction of label bias, and/or for creation of multiple different models for removal and/or reduction of sampling bias, thereby saving the effort that would otherwise be spent when standard approaches that first create the model and then detect bias are used.

At least some implementations of the systems, methods, apparatus, and/or code instructions described herein improve a computing device that trains machine learning models based on a training dataset, and/or improve a network connecting a client terminal to the computing device. The improvement to the computing device and/or network arises due to at least some implementations of the systems, methods, apparatus, and/or code instructions described herein, that analyze the training dataset to detect bias before the model is trained using the training dataset, which enables to take action in advance, and create a model without bias and/or reduced bias, optionally in a first attempt. The improvement to the computing device and/or network is in comparison to standard approaches in which first the model is trained using the training dataset, then evaluated for bias, and then is re-trained to reduce the bias, potentially over multiple iterations. The improvement to the computing device is obtained due to, for example, improved efficiency arising in detecting the bias before the model is generated and generating the non-biased or reduced bias model optionally the first time, which are obtained for example, in a reduction in processor utilization, reduction in processing time, reduction in memory requirements, and/or reduction in data storage requirements. The improvement to the network is obtained due to, for example, improved efficiency arising from sending the training data to a server, and receiving back the generated model with reduced and/or no bias, in comparison to sending and receiving training data and models multiple times over the network when using standard approaches. The improved is obtained, for example, in a reduction in network bandwidth, and/or reduction in network usage.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
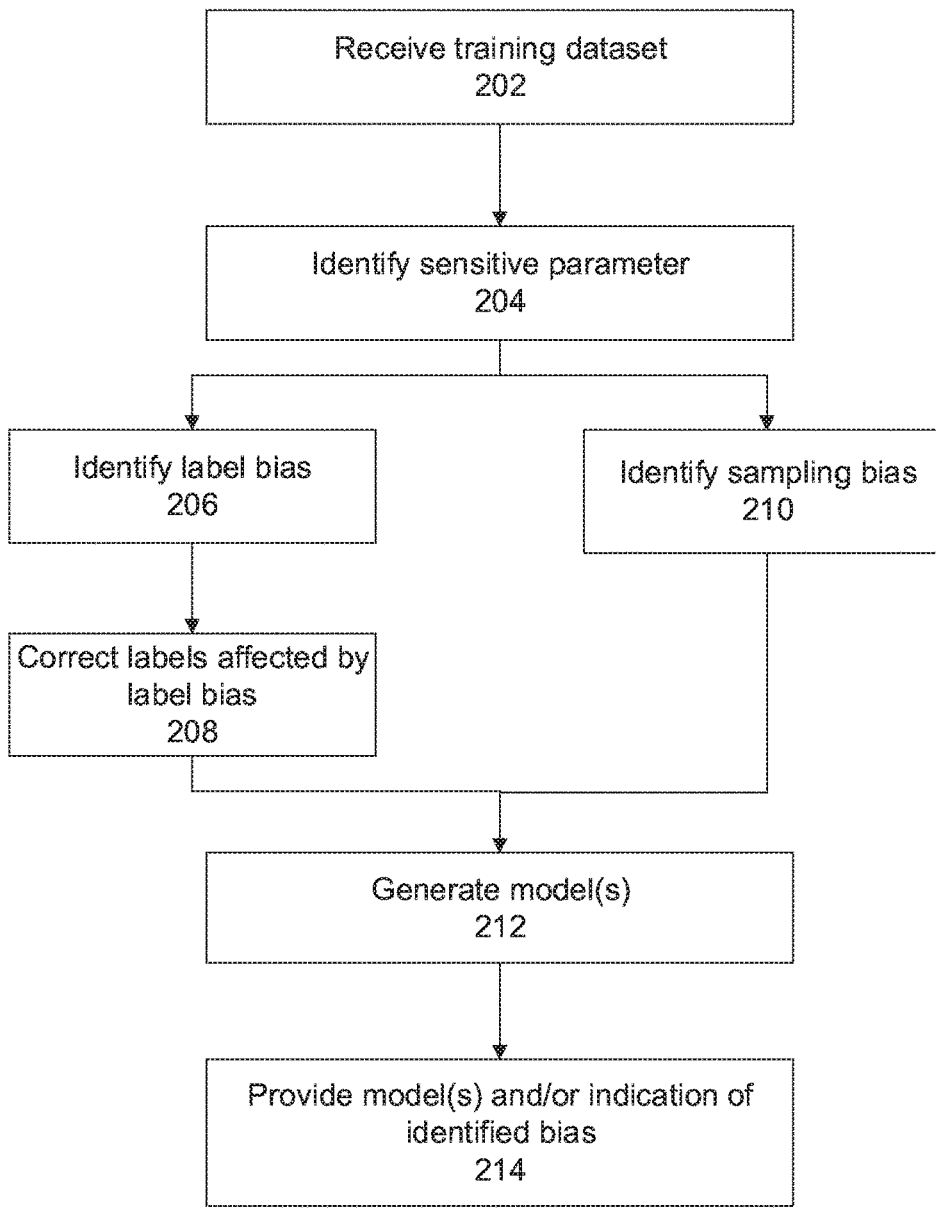
FIG. 2 is a flowchart of a method for detecting bias in a training dataset for training a machine learning model, in accordance with some embodiments.
Figure 3:
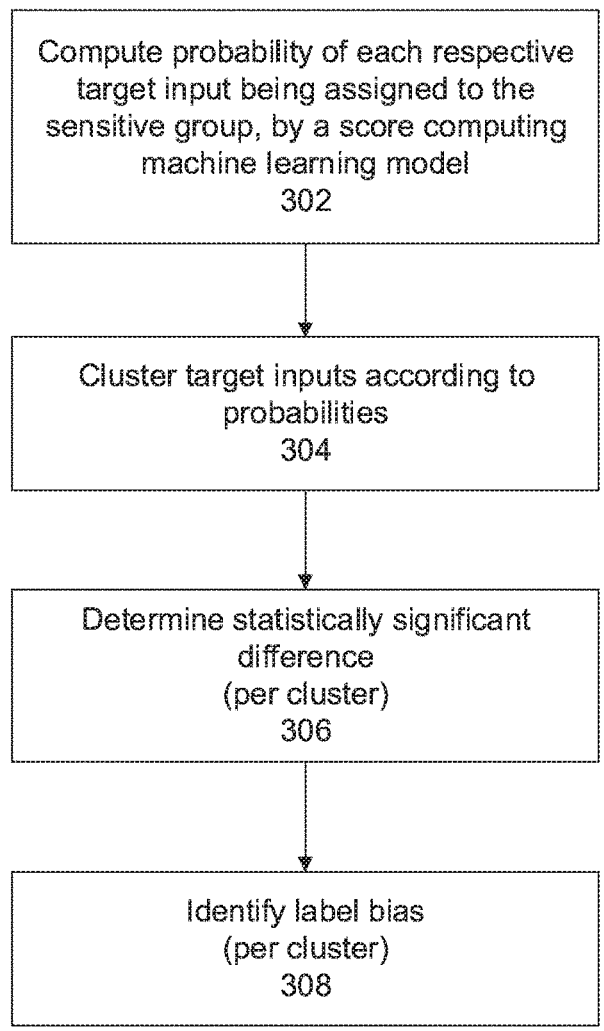
FIG. 3 is a flowchart of a method for detecting label bias, in accordance with some embodiments.
Figure 4:
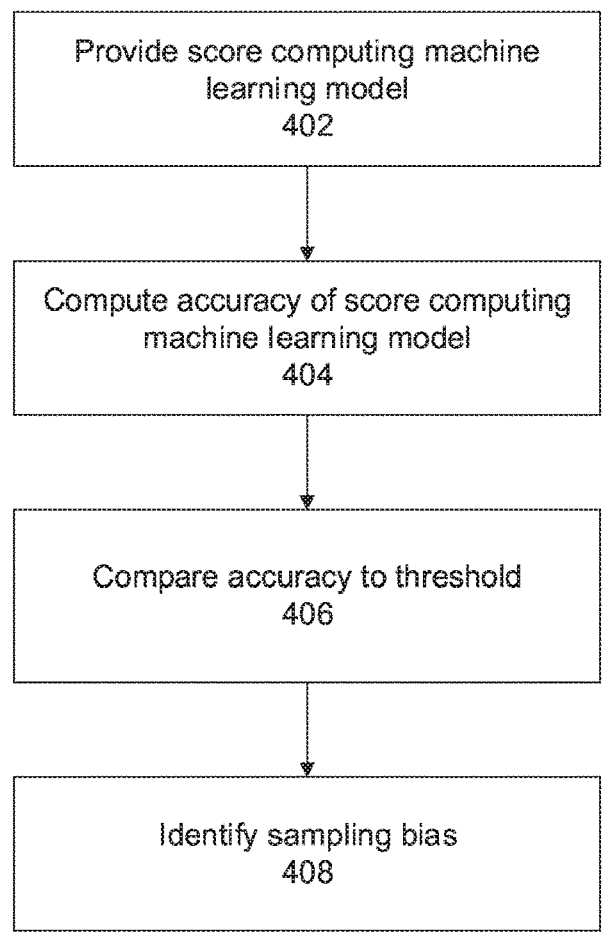
FIG. 4 is a flowchart of a method for detecting sampling bias, in accordance with some embodiments.

Reference is now made to FIG. 1, which is a block diagram of a system 100 for detecting bias in a training dataset for training a machine learning model, in accordance with some embodiments. Reference is also made to FIG. 2, which is a flowchart of a method for detecting bias in a training dataset for training a machine learning model, in accordance with some embodiments. Reference is also made to FIG. 3, which is a flowchart of a method for detecting label bias, in accordance with some embodiments. Reference is also made to FIG. 4, which is a flowchart of a method for detecting sampling bias, in accordance with some embodiments. System 100 may implement the acts of the method described with reference to FIGS. 2-4, by processor(s) 102 of a computing device 104 executing code instructions 106A and/or 106B stored in a storage device 106 (also referred to as a memory and/or program store).

Computing device 104 may be implemented as, for example, a client terminal, a server, a computing cloud, a virtual server, a virtual machine, a mobile device, a desktop computer, a thin client, a Smartphone, a Tablet computer, a laptop computer, a wearable computer, glasses computer, and a watch computer.

Multiple architectures of system 100 based on computing device 104 may be implemented. In an exemplary implementation, computing device 104 storing code 106A and/or 106B, may be implemented as one or more servers (e.g., network server, web server, a computing cloud, a virtual server) that provides services (e.g., one or more of the acts described with reference to FIG. 2-4) to one or more client terminals 112 over a network 114, for example, providing software as a service (SaaS) to the client terminal(s) 112, providing software services accessible using a software interface (e.g., application programming interface (API), software development king (SDK)), providing an application for local download to the client terminal(s) 112, and/or providing functions using a remote access session to the client terminals 112, such as through a web browser. For example, users use their locally installed client terminals 112 to access computing device 104, which may be remotely located. The users may provide their respective raw training dataset(s) 112A (which are to be evaluated for detection of label bias and/or sampling bias) to computing device 104, which performs the features as described with herein with reference to FIG. 2-4 (e.g., detect label and/or sampling bias, and/or correct labels, and/or generate one or more models such as one model per group when sampling bias is found), and provides output back to the respective client terminal, for example, provides the corrected training dataset, provides an indication of which biases were found, and/or provides the trained one or more machine learning models which were trained on the corrected training dataset and/or were trained per each group to prevent sampling bias. In another example, the connection from client terminal 112 to computing device 104 may be via a local application running on client terminal 112 that accesses the software interface to computing device 104. For example, the user is using a model creation application, and/or the user is using an application for creation of training data and/or the user is using an application which uses a trained model. The application sends the training data via the software interface to computing device 104, and receives output from computing device 104 via the software interface, for example, indication of which bias was found in the training dataset, corrected labels, and/or an indication of whether a respective model is to be computed for each identified group to avoid sampling bias, and/or the trained model(s). The application may provide the user with the output of the computing device 104 (e.g., indication of which biases were found in the data presented on the display) and/or use the output of the computing device 104 to continue processing (e.g., the corrected labels to continue to create the training dataset and/or to use to train the model, and/or the trained model(s) are provided to the application for use. In another example, server(s) 110 run applications which are remotely accessed by client terminals 112 over network 114. The applications on server(s) 110 provides the training dataset obtained by client terminals 112, and/or the trained dataset created by server(s) 110 according to input from client terminals 112, to computing device 104 via the software interface. The indication of identified bias, and/or corrected labels, and/or trained model(s) are provided by computing device 104 to server(s) 110 via the software interface. The applications running on server(s) 110 may, for example, present the indication of which biases were found in the training data on the display of the client terminals 112 and/or provide the trained models to client terminals 112, and/or locally use the trained models, and/or locally use the corrected training dataset to locally train the machine learning model.

In yet another example, different features described with reference to FIG. 2 may be performed by different devices. For example, score computing model 106B is created by another device and provided to computing device 104 (e.g., over network 114). In another example, the training of the model, to create trained model 116A, using corrected training dataset(s) 116B is performed by another device, that receives corrected training dataset(s) 116B from computing device 104 over network 114.

Processor(s) 102 of computing device 104 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 102 may include a single processor, or multiple processors (homogenous or heterogeneous) arranged for parallel processing, as clusters and/or as one or more multi core processing devices.

Data storage device 106 stores code instructions executable by processor(s) 102, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Storage device 106 stores code 106A that implements one or more features and/or acts of the method described with reference to FIGS. 2-4 when executed by processor(s) 102, trained score computing model code 106B that computes the scores as described herein.

Computing device 104 may include a data repository 116 for storing data, for example, training model(s) repository 116A that stores the trained models created from the corrected training dataset(s) and/or multiple trained models created for different groups to avoid or reduce sampling bias, and/or corrected training dataset(s) 116B that stores the training dataset with corrected labels, as described herein.

Data repository 116 may be implemented as, for example, a memory, a local hard-drive, virtual storage, a removable storage unit, an optical disk, a storage device, and/or as a remote server and/or computing cloud (e.g., accessed using a network connection). It is noted that raw training dataset(s) 112A may be stored by client terminal(s) 112 and/or computing device 104 and/or server(s) 110.

Network 114 may be implemented as, for example, the internet, a local area network, a virtual private network, a wireless network, a cellular network, a local bus, a point to point link (e.g., wired), and/or combinations of the aforementioned.

Computing device 104 may include a network interface 118 for connecting to network 114, for example, one or more of, a network interface card, a wireless interface to connect to a wireless network, a physical interface for connecting to a cable for network connectivity, a virtual interface implemented in software, network communication software providing higher layers of network connectivity, and/or other implementations. Computing device 104 may connect using network 114 (or another communication channel, such as through a direct link (e.g., cable, wireless) and/or indirect link (e.g., via an intermediary computing unit such as a server, and/or via a storage device) with client terminal(s) 112 and/or server(s) 110.

Computing device 104 and/or client terminal(s) 112 and/or server(s) 110 include and/or are in communication with one or more physical user interfaces 108 that include a mechanism for entering data (e.g., entering the text which is autocompleted) and/or for viewing data (e.g., viewing the autocomplete text), as described herein. Exemplary user interfaces 108 include, for example, one or more of, a touchscreen, a display, a keyboard, a mouse, and voice activated software using speakers and microphone.

Referring now back to FIG. 2, it is noted that features described with reference to 202-210 are performed prior to the feature of generating the machine learning models described with reference to 212.

At 202, a training dataset is received and/or created.

Optionally, the training dataset is a labelled dataset (e.g. for supervised learning by the model), which may be analyzed for label bias and/or sampling bias. Alternatively or additionally, the training dataset is unlabeled (e.g., for unsupervised learning by the model), which may be analyzed for sampling bias.

The training dataset includes multiple target inputs. Each target input may include multiple parameters, which may be assigned values, for example, stored as a vector. Each target input may be associated with a corresponding label, representing a group truth target output. The training dataset may be represented, for example, as a table, where each row indicates a respective target input (and optionally a corresponding label) and each column indicates a respective parameter. The cell may store respective values for parameters of each target input.

The training dataset may include, for example, text, characters, numbers, symbols, and/or non-text data (e.g., signals) and/or images, and/or other data. For the case of images, parameters of the target input may be features that are extractable from the image. For example, the training dataset may store data of people being selected for a sports team. The parameters when stored as text and/or numbers may include, for example, name, age, gender, height, weight, and prior experience. Some parameters may be extracted from an image of the people, for example, estimated age, gender, height, and weight.

At 204, one or more of the parameters of the target inputs includes a sensitive parameter. The sensitive parameter indicates that the corresponding target input assigned to a sensitive group that is potentially biased against other target inputs that are excluded from the sensitive group. The bias may be desired, where the different groups are to be processed by different models trained using different sets of data. The bias may be undesired, where the same result distribution is expected for the different groups.

Exemplary sensitive parameters include age, gender, and race, which represent features that are potentially source of bias which should be corrected, and/or which represent features are desired sources of bias which should be handled differently. In one example, people of different genders should be treated the same, without gender playing a role, for example, in considering qualifications of the respective candidate for a job gender should not play a role. In another example, people of different ages should be treated differently, with age playing a key role, for example, kids under 6 attending kindergarten are processed differently than kids over 6 attending school.

Optionally, the target inputs assigned to the sensitive group include the sensitive parameter, and/or other target inputs excluded from the sensitive group exclude the sensitive parameter. Alternatively or additionally, the target inputs assigned to the sensitive group include a value of the sensitive parameter meeting a requirement (e.g., equal to one or more values, above a threshold, below a threshold, within a range, outside of a range), and/or other target inputs excluded from the sensitive group include another value of the sensitive parameter that does not meet the requirement Optionally, the sensitive parameter is automatically identified from the target inputs by an automated process, for example, as described with reference to U.S. patent application Ser. No. 16/565,922, filed on Sep. 10, 2019, assigned to the same assignee, the contents of which are incorporated herein by reference in their entirety.

Alternatively or additionally, the sensitive parameter is manually selected by a user. For example, the user may user a graphical user interface (GUI) to define which parameter of the target input serves as the sensitive parameter. Alternatively or additionally, the sensitive parameter is pre-defined, for example, labelled in the target inputs of the training dataset, for example, using metadata, using a special sensitive parameter label, and/or using formatting that defines the sensitive parameter (e.g., first column in a table storing the training dataset is defined as the sensitive parameter).

At 206, the training dataset is analyzed to identify target inputs affected by label bias. The label bias is identified when a statistically significant difference is detected between target inputs assigned to the sensitive group and other target inputs excluded from the sensitive group.

Referring now back to FIG. 3, an exemplary process for detecting label bias is described.

At 302, a score computing machine learning model (e.g., 106B of FIG. 1), computes, for each respective target input, a probability of the respective target input being assigned to the sensitive group according to a respective value of the corresponding sensitive parameter.

The score computing machine learning model may be used to perform a causal inference process, for example, a propensity score matching (PSM). The sensitive parameter is set as a "treatment" of the causal inference procedure. The outputs from the score computing machine learning procedure are used as the probabilities of assignment to a respective value of the sensitive group, also known as the "propensity."

At 304, the target inputs are clustered into multiple clusters according to corresponding computed probabilities (or "propensities"). The target inputs assigned to each respective cluster are associated with probabilities within a certain probability value range, unique to that respective cluster. Each cluster includes target inputs assigned to the sensitive group and other target inputs excluded from the sensitive group.

For example, 10 clusters are created to cover the probability range from 0-100%, where each cluster covers 10%, i.e., the first cluster covers 0-10%, the second cluster 11-20%, and the last cluster 91-100%

Other numbers of clusters covering different ranges of probability values may be selected. The number of clusters and/or probability ranges may be selected, for example, by a user performing multiple experiments trying different values, and/or computed by code, to obtain a target sensitivity for detecting label bias.

The features described below with reference to 306 and 308 are implemented for each respective cluster.

At 306, an analysis is performed for determining whether the statistically significant difference exists between target inputs assigned to the sensitive group and other target inputs excluded from the sensitive group. The analysis may be performed, for example, using appropriate statistical methods that compare between groups of data, which may vary according to the format and/or type of the target inputs, for example, a t-test. The threshold used to determine statistical significance may be selected, for example, by a user, by code, and/or be preset, for example, according to desired reliability of detection of bias.

The implementation of the type of statistical test(s) may depend on the type of value(s) that the target output is assigned. For example, when the target output is assigned binary values (e.g., either 0 or 1), a binomial significance test may be used. In another example, when the target output is assigned a numerical value within a defined range, a t-test may be used. In yet another example, when the target output is assigned one or several values from a pre-defined set (i.e., the output is categorical), then a Chi-squared test may be used.

At 308, label bias for the respective cluster is identified when the statistically significant difference is determined. Label bias for the respective cluster is not identified when no statistical difference is determined.

When label bias is determined for the respective cluster, the target inputs affected by label bias include the target inputs assigned to the respective cluster (e.g., all of the target inputs assigned to the respective cluster), including the target inputs assigned to the sensitive group and other target inputs excluded from the sensitive group.

Referring now back to FIG. 2, at 208, labels of the target inputs (assigned to clusters) affected by label bias are corrected.

The labels of the target inputs assigned to the sensitive groups and the labels of the other target inputs excluded from the sensitive group may be corrected.

The labels may be corrected by assigning the same label to all of the target inputs assigned to the sensitive groups and to all of the other target inputs excluded from the sensitive group.

The label selected to serve as the common label may be determined, for example, by an analysis of existing labels to determine the label assigned to the majority of the target inputs affected by label bias, according to a set of rules, according to another machine learning model designed to select the label, and/or manually selected by a user.

At 210, the training dataset is analyzed to identify target inputs affected by sampling bias. The sampling bias is identified between target inputs of the sensitive group and other target inputs excluded from the sensitive group.

Referring now back to FIG. 4, an exemplary process for detecting sampling bias is described.

At 402, a score computing machine learning model (e.g., 106B of FIG. 1) for computing the probability of the respective target input being assigned to the sensitive group is provided. The score computing machine learning model may be the same score computing machine learning model used in the process for detecting label bias, as described with reference to 302 of FIG. 3

At 404, the accuracy of the score computing machine learning model for computing the probability of the respective target input being assigned to the sensitive group is obtained.

The measurement of accuracy may depend on the type of values that the target output is assigned (i.e., the type of machine learning task that is being implemented). For example, for binary classification or multi-label classification, a simple accuracy measure may be used, or alternatively a F1 score may be used when the prediction problem is highly imbalanced, such as where a majority class occupies more than 90% of the dataset. In another example, for regression problems where the target output may take on values in a continuous range, the $R^2$ measure may be used.

At 406, the accuracy of the score computing machine learning model is compared to a threshold (or other requirement, such as a range). The threshold may be selected to represent high accuracy, for example, 80%, 85%, 90%, or other values. In other words, whether the model predicts sensitive group membership very well from other predictor values, which indicates that there is sampling bias in the data, i.e., if there were no sampling bias then the ability to predict membership in the sensitive group would be poor. The threshold may be selected, for example, according to a desired accuracy for identifying sampling bias. The threshold may be set, for example, manually by a user, automatically by code, and/or a predefined stored value.

At 408, sampling bias is identified between target inputs of the sensitive group and other target inputs excluded from the sensitive group, when the accuracy of the score computing machine learning model is above the threshold.

Referring now back to FIG. 2, at 212, one or more machine learning model are generated (i.e., trained).

Optionally, the one or more models are generated using the corrected labels, when label bias is detected. Optionally, when only label bias is detected (i.e., no sampling bias is detected), a single model is trained. Alternatively or additionally, two or more models are generated, when sampling bias is detected and optionally label bias is detected (i.e., only sampling bias, or sampling bias and label bias). Each model is trained using the target inputs and optional label, optionally corrected labels, of the sensitive group and the target inputs excluded from the sensitive group. When there are two groups, the sensitive group and the non-sensitive group, one respective machine learning model is generated using the target inputs (and optionally the labels, optionally corrected labels) of the sensitive group, generating another respective machine learning model is generated for the other target inputs excluded from the sensitive group. Each machine learning model may be trained using a unique set of data, i.e., target inputs used to train one model are not used for the other model. It is noted that there may be three or more groups, in which case three or more machine learning models are generated, i.e., a model per group.

At 214, one or more of the following are provided: an indication of the detected bias (i.e., label and/or sampling bias), detected sensitive parameter, detected sensitive groups and target inputs assigned to the sensitive group, corrected labels, and/or trained machine learning model(s). For example, the indication of the detected bias may be presented on a display of a client terminal, enabling the user to understand the detected bias, understand the source of the bias, and determine how to proceed. In another example, the corrected labels are provided to the user, which may perform their own training of the model. In yet another example, the generated models with removed or reduced bias are provided to the user.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant machine learning models will be developed and the scope of the term machine learning model is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to embodiments. To the extent that section headings are used, they should not be construed as necessarily limiting.

What is claimed is:

1. A computer implemented method for detecting and reducing or removing bias for generating a machine learning model, comprising:
   (i) prior to generating the machine learning model:
      receiving a training dataset, comprising a plurality of target inputs, each comprising a plurality of parameters and labelled with a corresponding target output, wherein at least one of the plurality of parameters of at least one of the plurality of target inputs comprises a corresponding sensitive parameter indicative of a corresponding target input assigned to a sensitive group that is potentially biased against other target inputs that are excluded from the sensitive group;
      analyzing the training dataset to identify target inputs affected by label bias when a statistically significant difference is detected between target inputs assigned to the sensitive group and the other target inputs excluded from the sensitive group;
      correcting labels of the target inputs affected by label bias; and
   (ii) generating the machine learning model using the corrected labels.

2. The method of claim 1, further comprising:
   computing by a score computing machine learning model, for each respective target input, a probability of the respective target input being assigned to the sensitive group according to a respective value of the corresponding sensitive parameter.

3. The method of claim 2, further comprising:
   clustering the plurality of target inputs into a plurality of clusters according to corresponding computed probabilities, wherein for each respective cluster;
   wherein the target inputs are assigned to the respective cluster and associated with probabilities within a certain probability value range,
   wherein each cluster includes the target inputs assigned to the sensitive group and the other target inputs excluded from the sensitive group,
   for each respective cluster:
   determining whether the statistically significant difference exists between the target inputs assigned to the sensitive group and the other target inputs excluded from the sensitive group; and
   identifying label bias for the respective cluster when the statistically significant difference is detected,
   wherein the target inputs affected by label bias comprise the target inputs of the respective cluster, including the target inputs assigned to the sensitive group and the other target inputs excluded from the sensitive group.

4. The method of claim 3, wherein correcting labels of the target inputs affected by label bias comprises correcting labels for the target inputs assigned to the sensitive groups and labels of the other target inputs excluded from the sensitive group.

5. The method of claim 4, wherein the correcting labels comprises assigning the same label to all of the target inputs assigned to the sensitive groups and to all of the other target inputs excluded from the sensitive group.

6. The method of claim 2, wherein the probability of the respective target input being assigned to the sensitive group is computed by the score computing machine learning model performing a causal inference process, wherein a treatment of the causal inference process is the sensitive parameter.

7. The method of claim 6, wherein the causal inference process comprises a propensity score matching (PSM) process, and the probability denotes the propensity score.

8. The method of claim 2, further comprising:
   computing accuracy of the score computing machine learning model for computing the probability of the respective target input being assigned to the sensitive group; and
   identifying sampling bias between target inputs of the sensitive group and the other target inputs excluded from the sensitive group when the accuracy of the score computing machine learning model is above a threshold.

9. The method of claim 8, wherein (ii) generating further comprises generating one respective machine learning model for the target inputs of the sensitive group and generating another respective machine learning model for the other target inputs excluded from the sensitive group.

10. The method of claim 1, wherein each of the plurality of target inputs comprises the sensitive parameter, wherein the target inputs assigned to the sensitive group include a value of the sensitive parameter meeting a requirement, and the other target inputs excluded from the sensitive group include another value of the sensitive parameter that does not meet the requirement.

11. The method of claim 1, wherein the sensitive parameter is selected from a group consisting of: gender, race, and age.

12. A computer implemented method for detecting and reducing or removing bias for generating a machine learning model, comprising:
   (i) prior to generating the machine learning model:
      receiving a training dataset, comprising a plurality of target inputs, each comprising a plurality of parameters and labelled with a corresponding target output, wherein at least one of the plurality of parameters of at least one of the plurality of target inputs comprises a sensitive parameter indicative of a corresponding target input assigned to a sensitive group that is potentially biased against other target inputs that are excluded from the sensitive group;
      analyzing the training dataset to detect sampling bias between target inputs of the sensitive group and the other target inputs excluded from the sensitive group; and
   (ii) generating one respective machine learning model for the target inputs of the sensitive group and generating another respective machine learning model for the other target inputs excluded from the sensitive group.

13. The method of claim 12, further comprising computing accuracy of a score computing machine learning model that computes a probability of a certain target input being assigned to the sensitive group; and
   detecting the sampling bias when the accuracy of the score computing machine learning model is above a threshold.

14. A system for detecting and reducing or removing bias for generating a machine learning model, comprising:
   at least one hardware processor executing a code for:
      (i) prior to generating the machine learning model:
         receiving a training dataset, comprising a plurality of target inputs, each comprising a plurality of parameters and labelled with a corresponding target output, wherein at least one of the plurality of parameters of at least one of the plurality of target inputs comprises a sensitive parameter indicative of a corresponding target input assigned to a sensitive group that is potentially biased against target inputs that are excluded from the sensitive group;
         analyzing the training dataset to identify target inputs affected by label bias when a statistically significant difference is detected between target inputs assigned to the sensitive group and the target inputs excluded from the sensitive group;
         correcting labels of the target inputs affected by label bias; and
      (ii) generating the machine learning model using the corrected labels.

15. The system of claim 14, further comprising, code for:
   computing accuracy of a score computing machine learning model for computing a probability of a respective target input being assigned to the sensitive group; and
   identifying sampling bias between target inputs of the sensitive group and target inputs of the sensitive group when the accuracy of the score computing machine learning model is above a threshold.

16. The system of claim 15, wherein generating the machine learning model further comprises generating one respective machine learning model for the target inputs of the sensitive group and generating another respective machine learning model for the target inputs excluded from the sensitive group.

\* \* \* \* \*